(12) United States Patent
Myers

(10) Patent No.: US 7,703,360 B2
(45) Date of Patent: Apr. 27, 2010

(54) LATHE CHUCK HAVING A HOLLOW ARBOR

(76) Inventor: Douglas A. Myers, 384 W. Center St., Orom, UT (US) 84057

( * ) Notice: Subject to any disclaimer, the term of this patent is extended or adjusted under 35 U.S.C. 154(b) by 423 days.

(21) Appl. No.: 11/735,433

(22) Filed: Apr. 13, 2007

(65) Prior Publication Data

US 2007/0241520 A1    Oct. 18, 2007

Related U.S. Application Data

(60) Provisional application No. 60/792,204, filed on Apr. 13, 2006.

(51) Int. Cl.
*B23B 25/00* (2006.01)

(52) U.S. Cl. .................. 82/168; 279/8; 279/60; 279/145

(58) Field of Classification Search ............ 279/8, 279/136, 143, 145, 60; 82/165, 168; *B23B 25/00*
See application file for complete search history.

(56) References Cited

U.S. PATENT DOCUMENTS

| | | | | |
|---|---|---|---|---|
| 704,726 | A * | 7/1902 | Witzel | 269/74 |
| 1,692,379 | A * | 11/1928 | Kempton et al. | 279/136 |
| 2,435,480 | A * | 2/1948 | Tuttle | 279/2.03 |
| 2,518,508 | A * | 8/1950 | Van Bever | 82/169 |
| 2,665,136 | A * | 1/1954 | Fallon | 279/138 |
| 2,793,867 | A * | 5/1957 | Stnart | 279/16 |
| 2,803,159 | A * | 8/1957 | Hohwart et al. | 82/168 |
| 3,041,699 | A * | 7/1962 | Daniel | 425/84 |
| 3,125,837 | A * | 3/1964 | Lebermann | 451/398 |
| 3,601,048 | A * | 8/1971 | Beisel | 101/348 |
| 4,483,522 | A * | 11/1984 | Nall et al. | 269/48.1 |
| 4,512,696 | A * | 4/1985 | Cukelj | 409/233 |
| 4,871,286 | A * | 10/1989 | Hunt | 408/144 |
| 5,782,591 | A * | 7/1998 | Wilkinson, Jr. | 409/131 |
| 5,927,913 | A * | 7/1999 | Mizoguchi | 408/238 |
| 6,035,512 | A * | 3/2000 | Cook | 29/447 |
| 6,854,742 | B2 * | 2/2005 | Salyer et al. | 279/93 |
| 7,290,968 | B1 * | 11/2007 | Wu | 409/233 |
| 7,431,543 | B2 * | 10/2008 | Buettiker et al. | 408/233 |
| 2005/0284271 | A1 * | 12/2005 | Yau | 82/112 |

* cited by examiner

*Primary Examiner*—Eric A Gates
(74) *Attorney, Agent, or Firm*—Angus C. Fox, III

(57) ABSTRACT

The present invention provides a lathe chuck having a hollow arbor and a cylindrical turning shaft which slides within the hollow arbor. Such an arrangement accommodates a turning shaft of considerably greater length than would ordinarily be possible. For one embodiment of the invention, the chuck is hand-tightenable, the arbor is an integral part of the chuck assembly, and is equipped with a standard Morse taper. The tapered arbor installs in the end of a lathe output shaft or spindle. The turning shaft is equipped with at least one pair of work-securing collets, at least one threaded end and a nut which engages the threaded end and secures one or more work pieces between the collets and to the turning shaft.

14 Claims, 2 Drawing Sheets

LATHE CHUCK HAVING A HOLLOW ARBOR

This application has a priority date based on the filing of provisional patent application 60/792,204, which was filed on Apr. 13, 2006.

FIELD OF THE INVENTION

This invention relates, generally, to lathes, lathe tools and attachments and, more particularly, to lathe chucks and chuck spindles.

BACKGROUND OF THE INVENTION

During the past decade, the manufacture of custom pens has become a popular and lucrative hobby. Typically, pen enthusiasts purchase metal hardware and small blanks of exotic woods. The blanks are center drilled, then individually placed on a turning shaft between collets. The shaft is then inserted in a lathe spindle, and after the blank is tightened between the collets, the blank is turned on the lathe to create a pen barrel or cap having a desired shape. After staining and/or lacquering, metal pieces are pressed into the turned barrel and cap wood pieces to crate a finished pen body. As pieces to be turned vary greatly in length, a lathe operator will typically have a number of turning shafts, each of which accommodates blanks within a range of lengths. What is needed is a new lathe chuck design requiring but a single turning shaft which accommodates blanks within a wide range of lengths.

SUMMARY OF THE INVENTION

The present invention provides a lathe chuck having a hollow arbor and a cylindrical turning shaft which slides within the hollow spindle. Such an arrangement accommodates a turning shaft of considerably greater length than would ordinarily be possible. For one embodiment of the invention, the chuck is hand-tightenable, the arbor is an integral part of the chuck assembly, and is equipped with a standard Morse taper. The tapered arbor installs in the end of a lathe output shaft or spindle. The turning shaft is equipped with at least one pair of work-securing collets, at least one threaded end and a nut which engages the threaded end and secures one or more work pieces between the collets and to the turning shaft.

PREFERRED EMBODIMENT OF THE INVENTION

The new lathe chuck assembly and associated turning shaft will now be described in greater detail and with reference to the included drawing FIGS. 1 through 6. It should be understood that the items may not necessarily be drawn to scale, although such was the intention.

Figures 1, 2, 3:
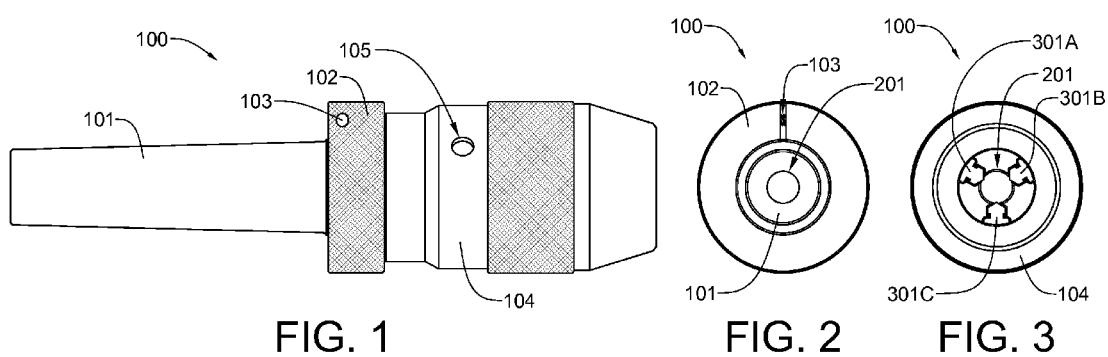
FIG. 1 is a side elevational view of the new lathe chuck.
FIG. 2 is an arbor-end elevational view of the new lathe chuck.
FIG. 3 is a jaws-end elevational view of the new lathe chuck.

Referring now to FIG. 1, the new lathe chuck 100 includes an arbor 101 having a standard Morse taper, a knurled split ring 102 secured with a single screw 103 to the arbor 101, and a jaw retainer body 104 threadably secured to the arbor 101. The jaw retainer body 104 has three cylindrical recesses 105 (only one is visible in this view) radially spaced 120 degrees apart, which enable the chuck to be tightened or loosened with a pin wrench (not shown).

Referring now to FIG. 2, the new lathe chuck 100 is seen from the arbor end thereof. In this view, it will be noted that both the arbor 101, the jaw holder 601, and jaw retainer body 104 are hollow, such that daylight can be seen at the end of the bore 201.

Referring now to FIG. 3, the new lathe chuck 100 is seen from the jaws end thereof. In this view, the opposite end of bore 201 is visible, as are three jaws 301A, 301B and 301C within the jaw retainer body 104.

Figure 4:
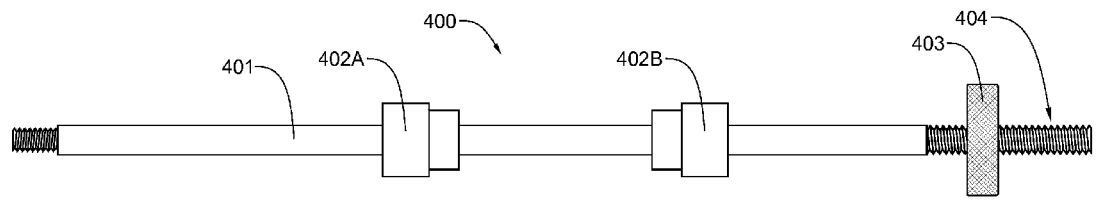
FIG. 4 is a side elevational view of the turning shaft, a pair of collets installed thereon, and a knurled finger nut installed on the threaded right end of the turning shaft.

Referring now to FIG. 4, a turning shaft assembly 400 is shown, which includes a turning shaft 401 which is threaded at both ends thereof, a pair of collets 402A and 402B which are slidable on the turning shaft 401, and a knurled finger nut 403 which is shown having engaged the threaded right end 404 of the turning shaft 401. The knurled finger nut 403 is used to secure a work piece between the collets 402A and 402B and the collets themselves between the knurled finger nut 403 and the jaws end of the chuck 100.

Figure 5:
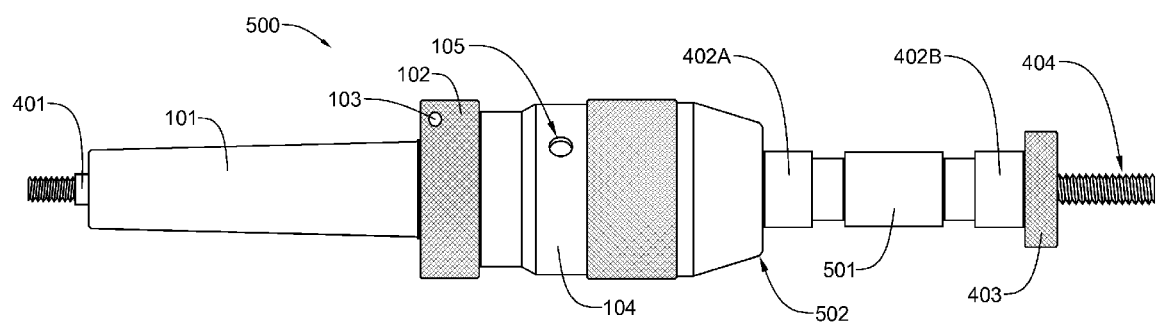
FIG. 5 is a side elevational view of an assembly consisting of the new lathe chuck, the turning shaft, the collets, a workpiece sandwiched between the collets, and the knurled nut.

Referring now to FIG. 5, a complete new chuck and turning shaft assembly 500 is shown in this view. The turning shaft 401 has been inserted into the jaws end of the chuck 100 so that the left end thereof protrudes from the arbor 101. In this view, the knurled finger nut 403 has secured a work piece 501 between the collets 402A and 402B and the collets themselves between the knurled finger nut 403 and the jaws end 502 of the chuck 100.

Figure 6:
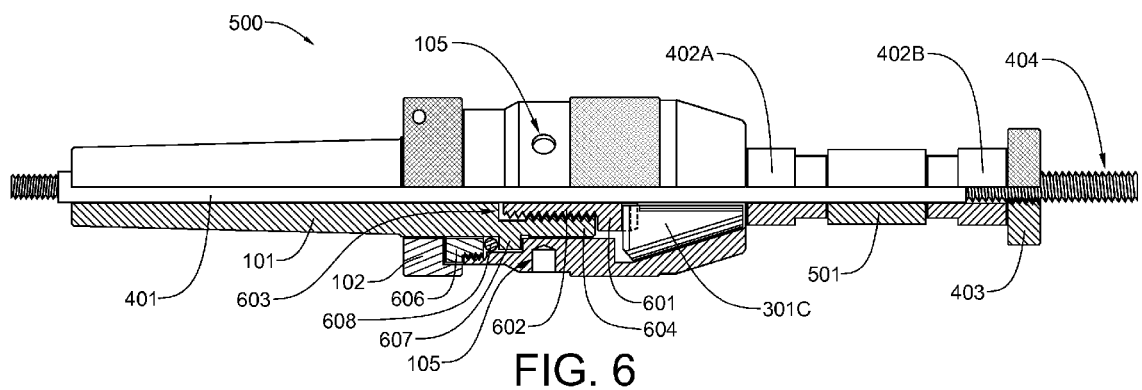
FIG. 6 is a quarter-cross-sectional side view of the assembly of FIG. 5, but with the turning shaft and the visible chuck jaw being unsectioned.

Referring now to FIG. 6, the complete new chuck and turning shaft assembly 500 is shown in a partial cross-sectional view. In this view, only the single visible chuck jaw 301C and the turning shaft 402 are unsectioned. In this view, it will be noted that knurled split ring 102 is secured to and rotates with the arbor 101, that the jaw retainer body 104 houses a jaw holder 601 having a male extension 602, which axially and threadably engages an axial female socket 603 machined in the right end 604 of the arbor 101. As the jaw holder 601 slides back and forth in response to rotation of the arbor within the jaw retainer body 104, it either pulls the jaws 301A, 301B and 301C rearward to disengage the turning shaft 401 or pushes them forward to engage the turning shaft 402. As the jaws are pushed forward, they climb the ramp 605 and squeeze against the turning shaft 401. It will also be noted that a threaded retainer ring 606 retains the arbor 101 within the jaw retainer body 104. The arbor 101 incorporates an annular ridge 607. A circular array of ball bearings 608 provides reduced friction between the annular ridge 607 and the threaded retainer ring 606 as the arbor rotates to tighten the jaws 301A, 301B and 301C.

Although only a single embodiment of the new lathe chuck assembly is shown and described, it will be obvious to those having ordinary skill in the art that changes and modifications may be made thereto without departing from the scope and the spirit of the invention as hereinafter claimed.

What is claimed is:

1. A lathe chuck comprising:
 a tapered hollow arbor having a cylindrical central aperture which extends the length thereof;
 a cylindrical turning shaft which slides within the hollow arbor;
 a pair of collets, each of which slides over the turning shaft, and which can be positioned at opposite ends of a workpiece;
 threads formed on at least one end of said turning shaft; and
 a nut which engages said threads and can be used to secure a workpiece between said pair of collets.

2. The lathe chuck of claim 1, wherein said taper is Morse taper.

3. The lathe chuck of claim 1, wherein said nut is a knurled finger nut.

4. The lathe chuck of claim 1, which further comprises a jaw retainer body rotatably coupled to a larger diameter end of said tapered arbor.

5. The lathe chuck of claim 4, which further comprises a split ring having a knurled outer surface, said split ring being secured to the larger diameter end of said tapered arbor.

6. The lathe chuck of claim 5, which further comprises three jaws which are installed within the jaw retainer body, and which can be tightened against the turning shaft by rotating the jaw retainer body while the arbor is held stationary.

7. The lathe chuck of claim 6, wherein said jaw retainer body has an aperture which aligns with the cylindrical central aperture, thereby enabling a cylindrical shaft which is inserted within the jaws to be positioned within both the jaw retainer body and the arbor.

8. The lathe chuck of claim 4, wherein said jaw retainer body is also knurled to enable the chuck to be tightened and loosened without the use of a key.

9. A workpiece holder comprising:
 a tapered hollow arbor having a cylindrical central aperture which extends the length thereof;
 an adjustable chuck coupled to a larger end of said tapered hollow arbor, said adjustable chuck having a hollow jaw holder threadably coupled to the larger end of said tapered hollow arbor, three jaws mounted within the jaw holder, a hollow jaw retainer body that moves the jaw holder and the jaws forward or back as it is rotated;
 a cylindrical turning shaft which slides through said through-hole aperture and within said hollow arbor;
 a pair of collets, each of which slides over the turning shaft, and which can be positioned at opposite ends of a workpiece;
 threads formed on at least one end of said turning shaft; and
 a nut which engages said threads and can be used to secure a workpiece between said pair of collets.

10. The workpiece holder of claim 9, wherein said taper is a Morris taper.

11. The workpiece holder of claim 9, wherein said nut is a knurled finger nut.

12. The workpiece holder of claim 9, which further comprises a split ring having a knurled outer surface, said split ring, in combination with a clamping screw, operating to secure said adjustable chuck to said tapered hollow arbor.

13. The workpiece holder of claim 9, wherein the three jaws can be tightened against the turning shaft by rotating the jaw retainer body while the arbor is held stationary.

14. The workpiece holder of claim 9, wherein said jaw retainer body is also knurled to enable the chuck to be tightened and loosened without the use of a key.

* * * * *